United States Patent
Floor et al.

(10) Patent No.: US 11,958,503 B2
(45) Date of Patent: Apr. 16, 2024

(54) TECHNIQUES FOR NAVIGATING AN AUTONOMOUS VEHICLE BASED ON PERCEIVED RISK

(71) Applicant: MOTIONAL AD LLC, Boston, MA (US)

(72) Inventors: Boaz Cornelis Floor, Singapore (SG); Marc Dominik Heim, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/233,298

(22) Filed: Apr. 16, 2021

(65) Prior Publication Data

US 2022/0340169 A1    Oct. 27, 2022

(51) Int. Cl.
*B60W 60/00*    (2020.01)
*B60W 30/095*   (2012.01)
*G01C 21/34*    (2006.01)

(52) U.S. Cl.
CPC .... *B60W 60/0015* (2020.02); *B60W 30/0956* (2013.01); *G01C 21/3453* (2013.01); *B60W 2554/80* (2020.02); *B60W 2555/60* (2020.02)

(58) Field of Classification Search
CPC ......... B60W 60/0015; B60W 30/0956; B60W 2554/80; B60W 2555/60; G01C 21/3453
See application file for complete search history.

(56) References Cited

U.S. PATENT DOCUMENTS

| | | | |
|---|---|---|---|
| 2017/0355368 A1* | 12/2017 | O'Dea | B60W 30/14 |
| 2018/0061253 A1 | 3/2018 | Hyun | |
| 2018/0096602 A1* | 4/2018 | She | G05D 1/0295 |
| 2019/0080266 A1* | 3/2019 | Zhu | G05D 1/0217 |
| 2019/0100212 A1 | 4/2019 | Oh | |
| 2019/0212744 A1 | 7/2019 | Milstein et al. | |
| 2019/0291726 A1 | 9/2019 | Shalev-Shwartz et al. | |
| 2020/0079385 A1* | 3/2020 | Beaurepaire | B60W 30/025 |
| 2020/0142417 A1 | 5/2020 | Hudecek | |
| 2020/0310446 A1* | 10/2020 | Zhu | G05D 1/0217 |
| 2020/0398894 A1 | 12/2020 | Hudecek et al. | |
| 2021/0094577 A1* | 4/2021 | Shalev-Shwartz | B60W 30/0953 |

FOREIGN PATENT DOCUMENTS

WO    WO 2017/120336 A2    7/2017

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Great Britain Office Action issued for Application No. GB 2117359.6, dated May 23, 2022.
Korean Office Action issued for Application No. KR 10-2021-0183998 dated Aug. 24, 2023.

* cited by examiner

*Primary Examiner* — Jonathan L Sample
*Assistant Examiner* — Tristan J Greiner
(74) *Attorney, Agent, or Firm* — Knobbe, Martens, Olson & Bear LLP

(57) ABSTRACT

Systems and methods for selecting a trajectory for an autonomous vehicle based on perceived risk are provided. A trajectory is selected that satisfies objective safety constraints and minimizes an overall cost based at least in part on cost components representing the perceived risk of the trajectory. The vehicle is navigated according to the selected (e.g., optimized) trajectory.

24 Claims, 16 Drawing Sheets

TECHNIQUES FOR NAVIGATING AN AUTONOMOUS VEHICLE BASED ON PERCEIVED RISK

FIELD

This description relates to navigating an autonomous vehicle based on perceived risk.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings.

SUMMARY

The subject matter described in this specification is directed to systems and techniques for controlling an autonomous vehicle by determining a trajectory for the autonomous vehicle. Generally, the systems are configured to select a trajectory for navigating the autonomous vehicle. This trajectory is based on the perceived risk to the autonomous vehicle, such that the selected trajectory minimizes an overall cost including perceived risk cost components.

These and other aspects, features, and implementations will become apparent from the following descriptions, including the claims.

DETAILED DESCRIPTION

Figure 1:
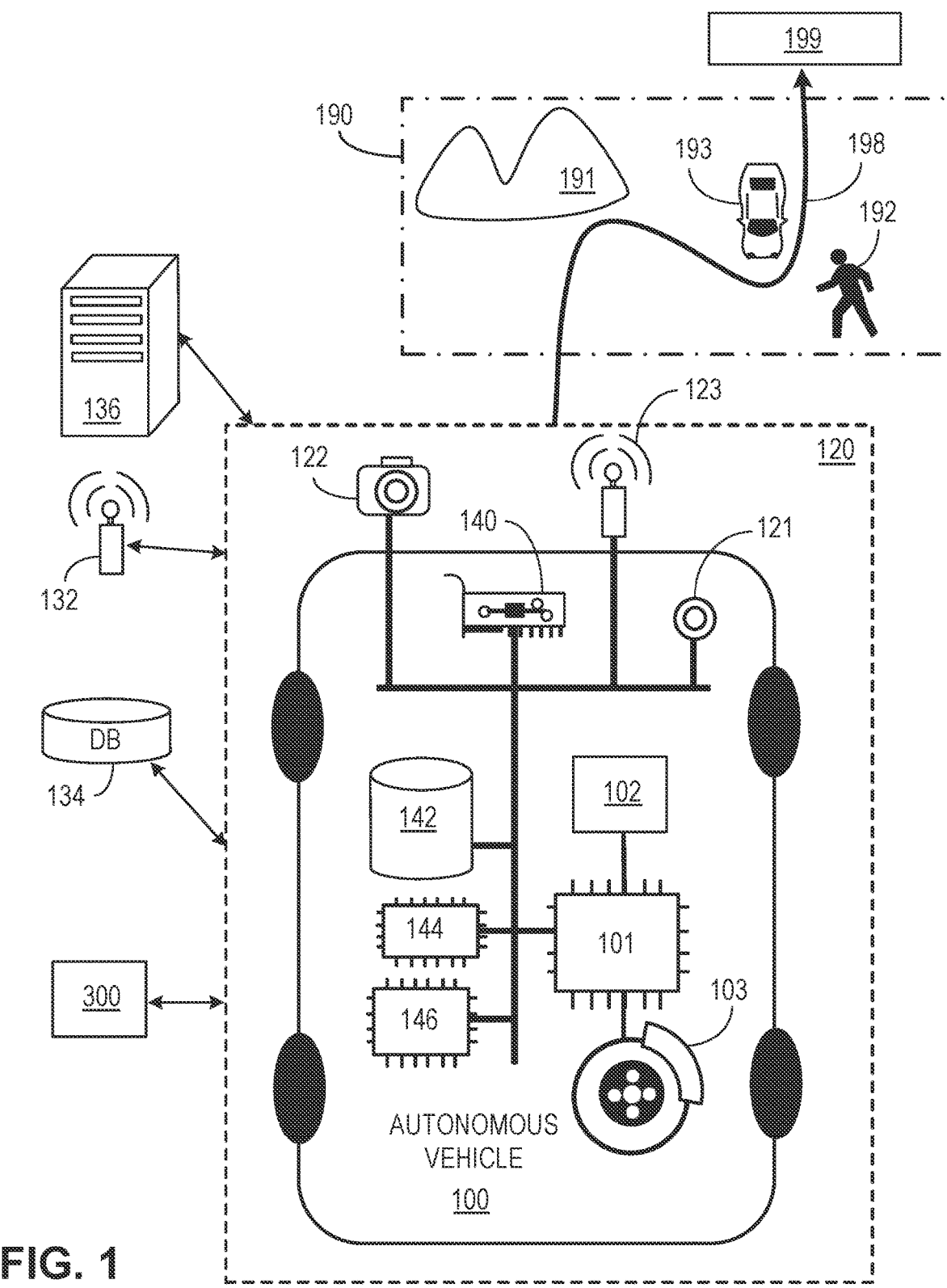
FIG. 1 shows an example of an autonomous vehicle having autonomous capability.

In the following description, for the purposes of explanation, numerous specific details are set forth in order to provide a thorough understanding of the present disclosure. It will be apparent, however, that the disclosed techniques may be practiced without these specific details. In other instances, well-known structures and devices are shown in block diagram form in order to avoid unnecessarily obscuring the disclosed techniques.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Computing System for Object Detection Using Pillars
8. Example Point Clouds and Pillars
9. Example Process for Detecting Objects and Operating the Vehicle Based on the Detection of the Objects General Overview Autonomous vehicles driving in complex environments (e.g., an urban environment) pose a great technological challenge. In order for autonomous vehicles to navigate these environments, an autonomous vehicle selects a trajectory for navigating along a path. Although the trajectory is objectively safe (e.g., safety constraints on the speed and position of the autonomous vehicle are satisfied by the trajectory), navigating according to the trajectory may present perceived risks. For example, a trajectory may dictate that the autonomous vehicle steer closer to an obstacle, seeming as though the autonomous vehicle could hit the obstacle. The autonomous vehicle determines that the trajectory satisfies the set of lateral constraints and the set of speed constraints. As long as the trajectory is objectively safe, the optimized trajectory is selected using an objective measurement of quality (e.g., a cost calculation) based at least in part on the perceived risk of the trajectory (e.g., selecting the trajectory that minimizes an overall cost including perceived risk cost components). By using the objective measurement of quality, the autonomous vehicle's trajectory represents an optimized solution that takes into account the perceived risk the trajectory presents in light of other objective quality parameters (e.g., other cost factors).

Systems and techniques are described herein for acting on perceived risk by selecting a trajectory by which the autonomous vehicle should navigate. By virtue of the implementation of the systems, methods, and computer program products described here, the operation of autonomous vehicles is improved by providing a more nuanced and useful evaluation of a trajectory and by making navigation decisions based on that more nuanced and useful evaluation. In particular, by optimizing a trajectory based at least in part on the perceived risk of navigating according to the trajectory, an autonomous vehicle can choose to navigate according to a trajectory that seems less risky, much as a human operator would, but without sacrificing objective safety. Moreover, by choosing to navigate according to a trajectory that seems less risky, the impetus for a human passenger in the car to assume manual control or otherwise correct the vehicle (e.g., if the human passenger feels that a trajectory is risky, even if the trajectory is objectively safe) is reduced, thus using the processor to make navigation decisions more efficiently.

In particular, an example technique includes: while a vehicle is operating in an autonomous mode, obtaining a path, a set of lateral constraints, and a set of speed constraints, wherein the set of lateral constraints define a first distance between a first side of the vehicle and a first obstacle and a second distance between a second side of the vehicle and a second obstacle, and wherein the set of speed constraints define a maximum or minimum speed of the vehicle; selecting a trajectory for navigating according to the path that satisfies the set of lateral constraints and the set of speed constraints, wherein selecting the trajectory includes: determining that the trajectory satisfies the set of lateral constraints and the set of speed constraints; and determining that the trajectory minimizes an overall cost, wherein the overall cost includes a first cost component representing a perceived risk to the first side of the vehicle and a second cost component representing a perceived risk to the second side of the vehicle; and navigating the vehicle along the path according to the trajectory.

These and other aspects, features, and implementations can be expressed as methods, apparatuses, systems, components, program products, means or steps for performing a function, and in other ways.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
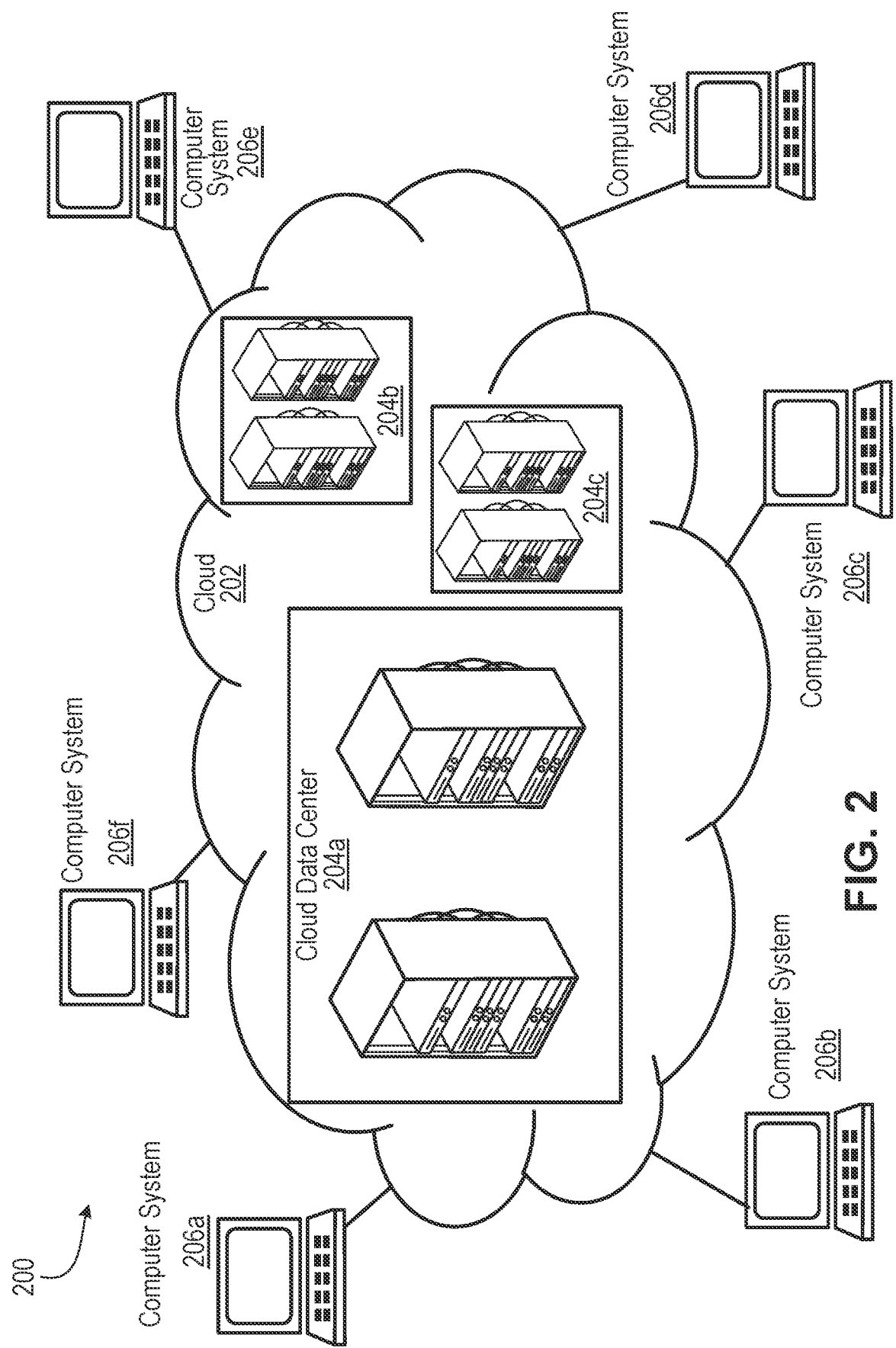
FIG. 2 shows an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
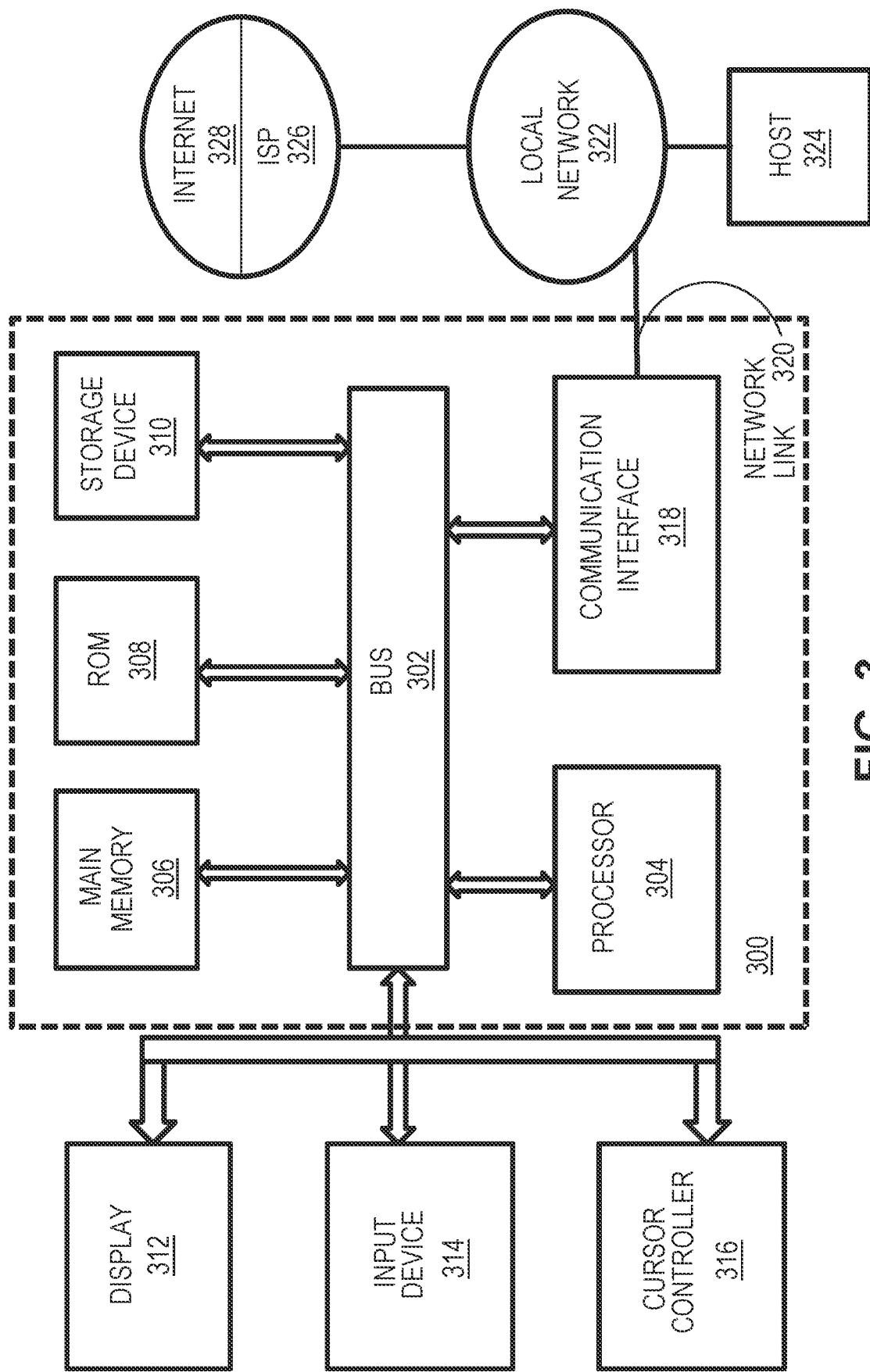
FIG. 3 shows a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
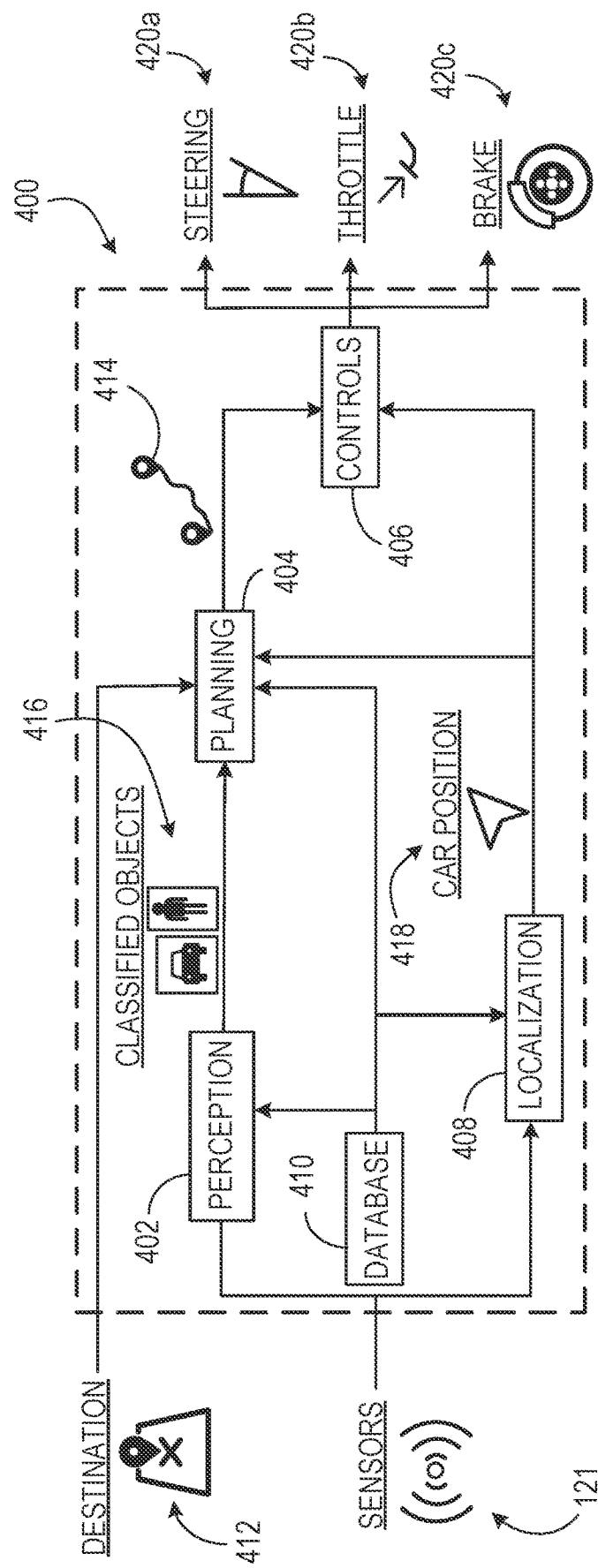
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
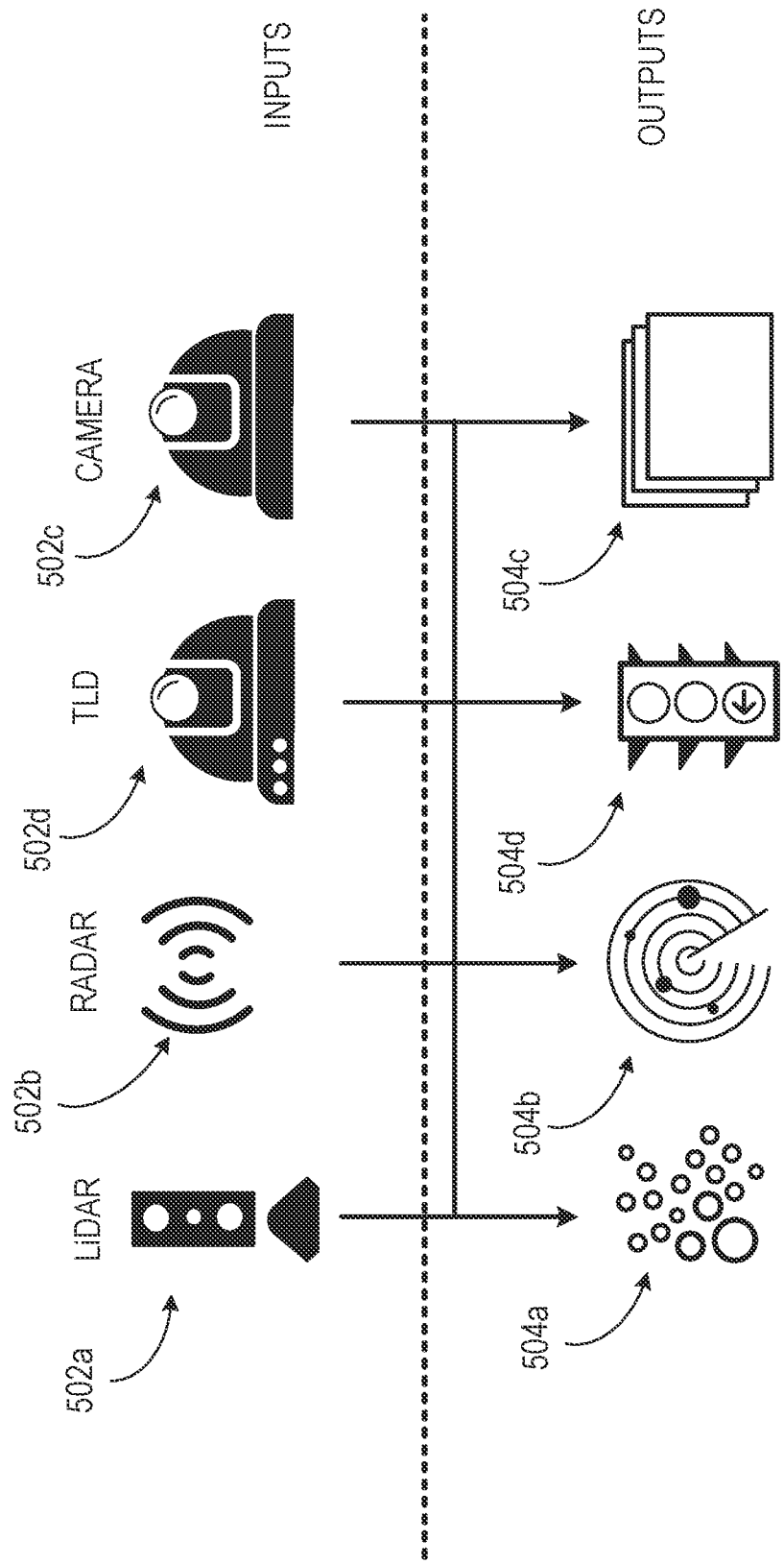
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
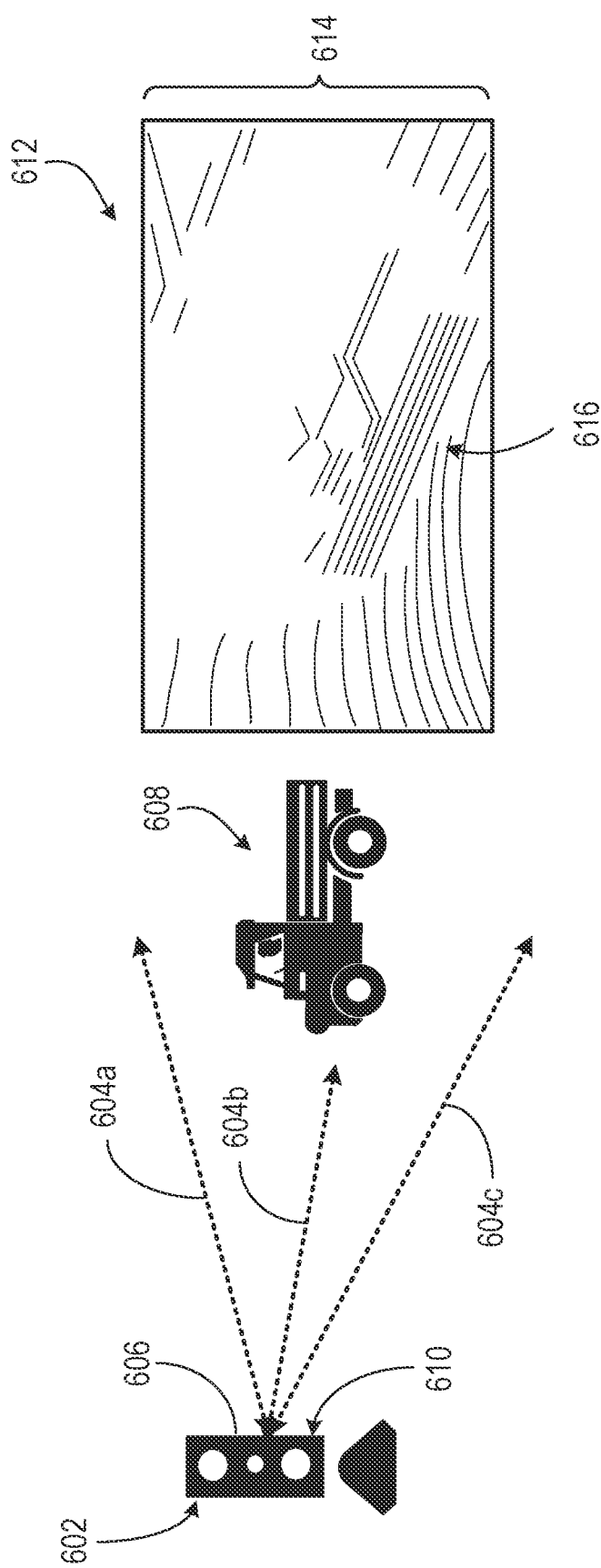
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
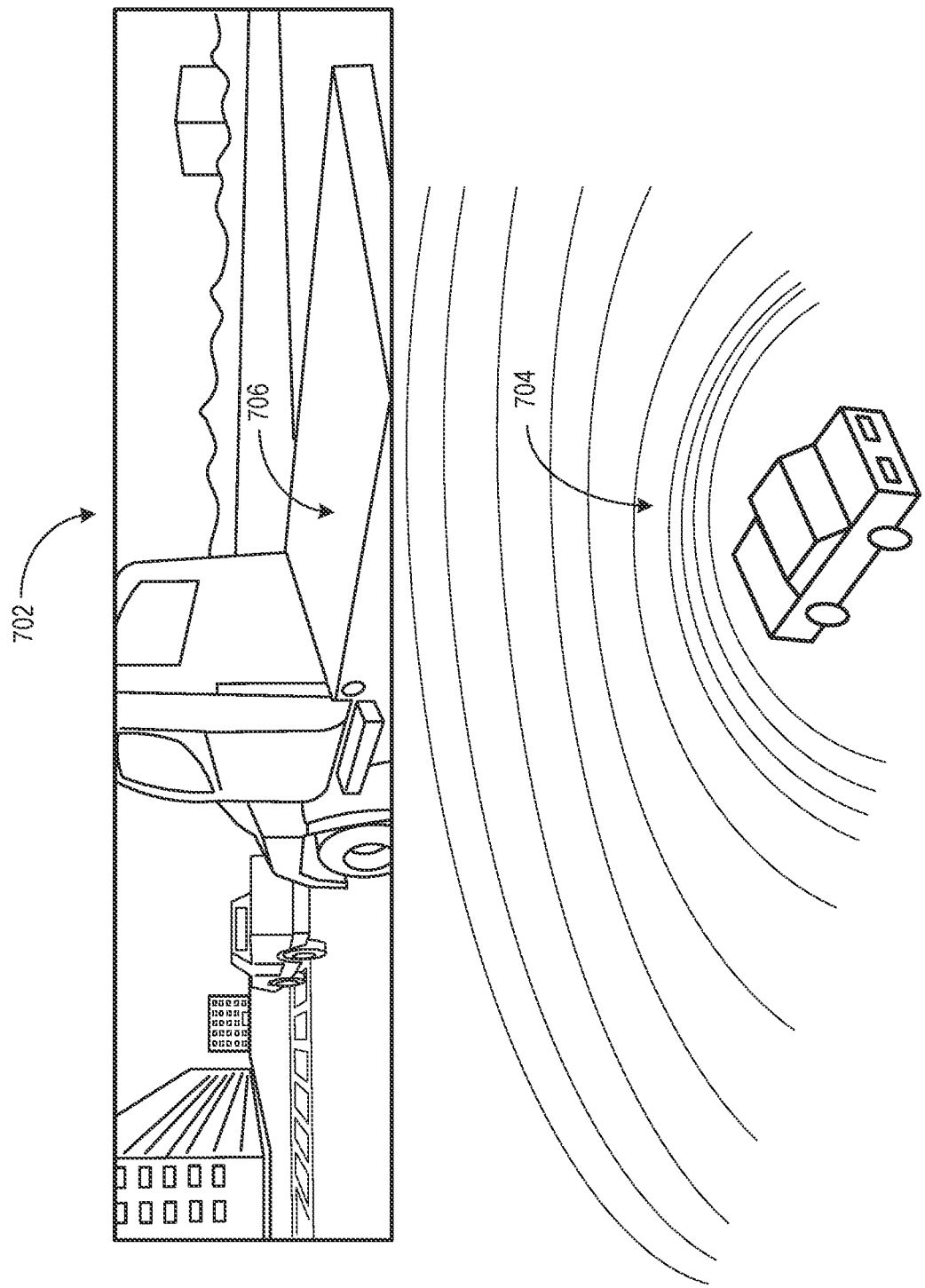
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
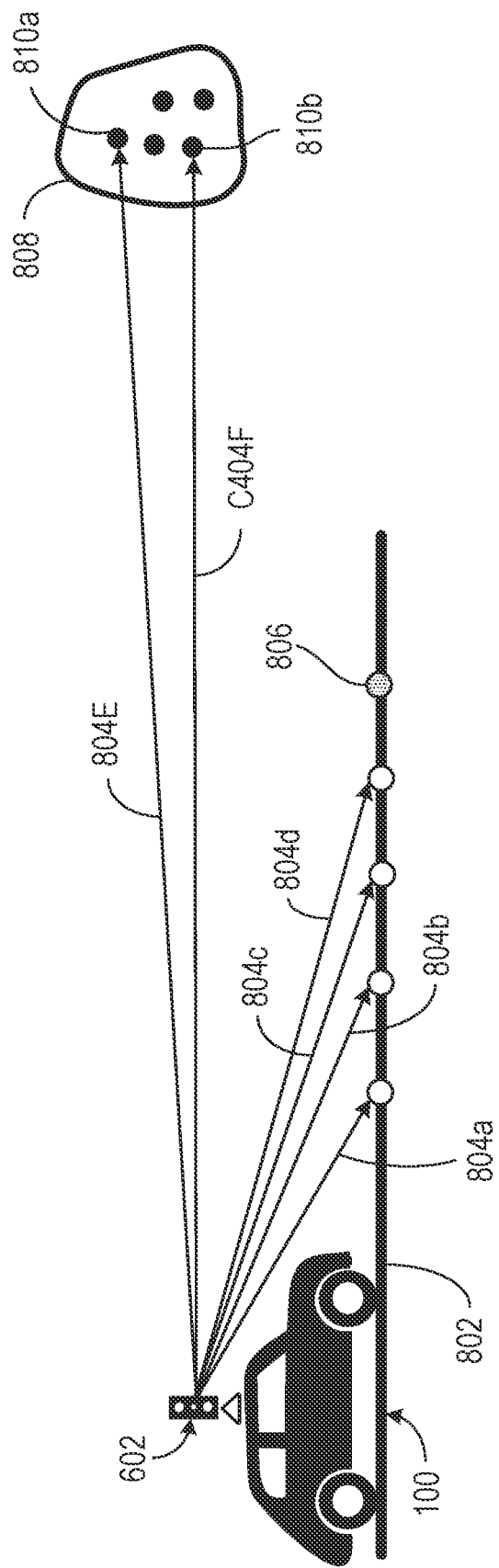
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
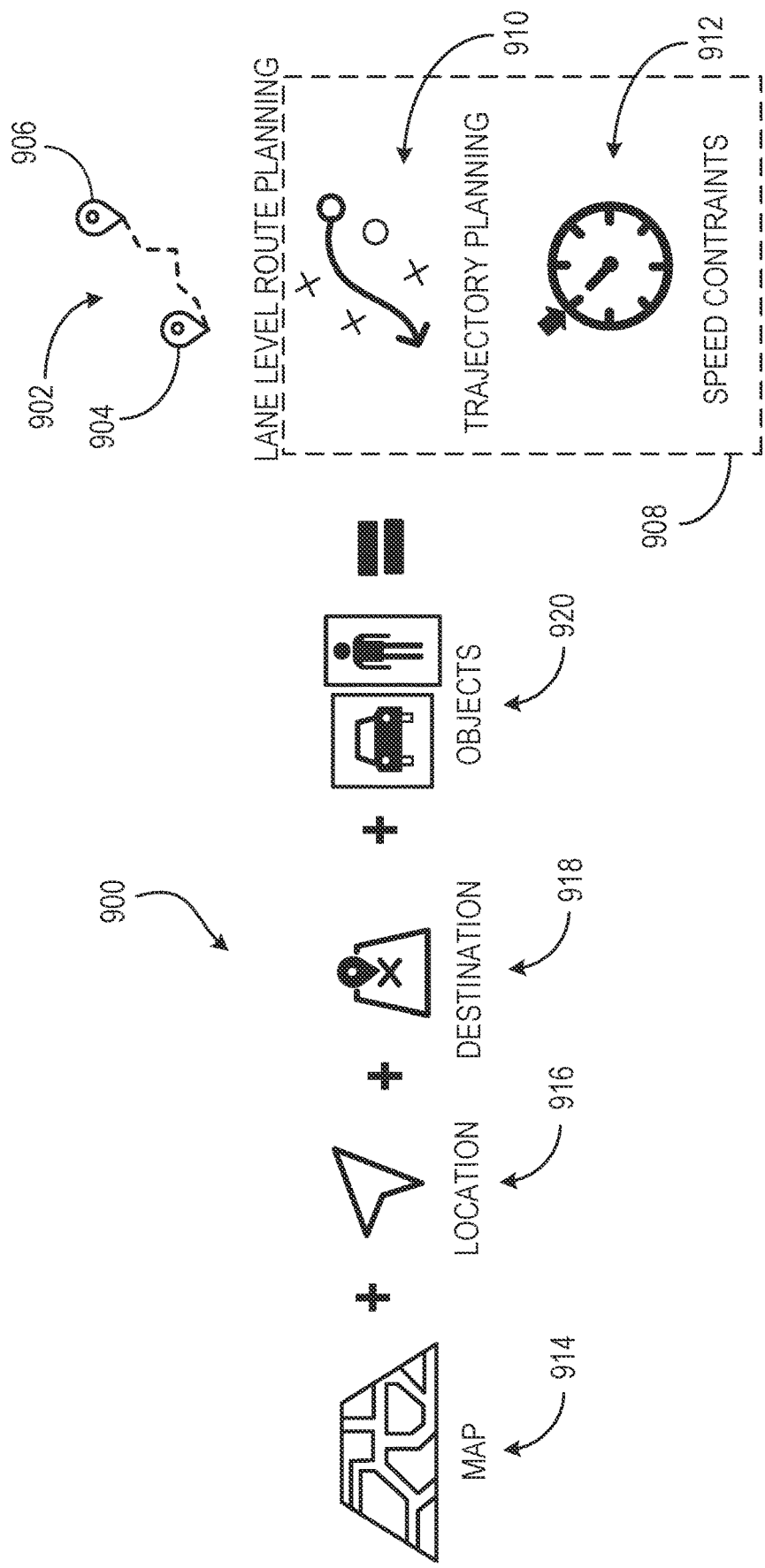
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
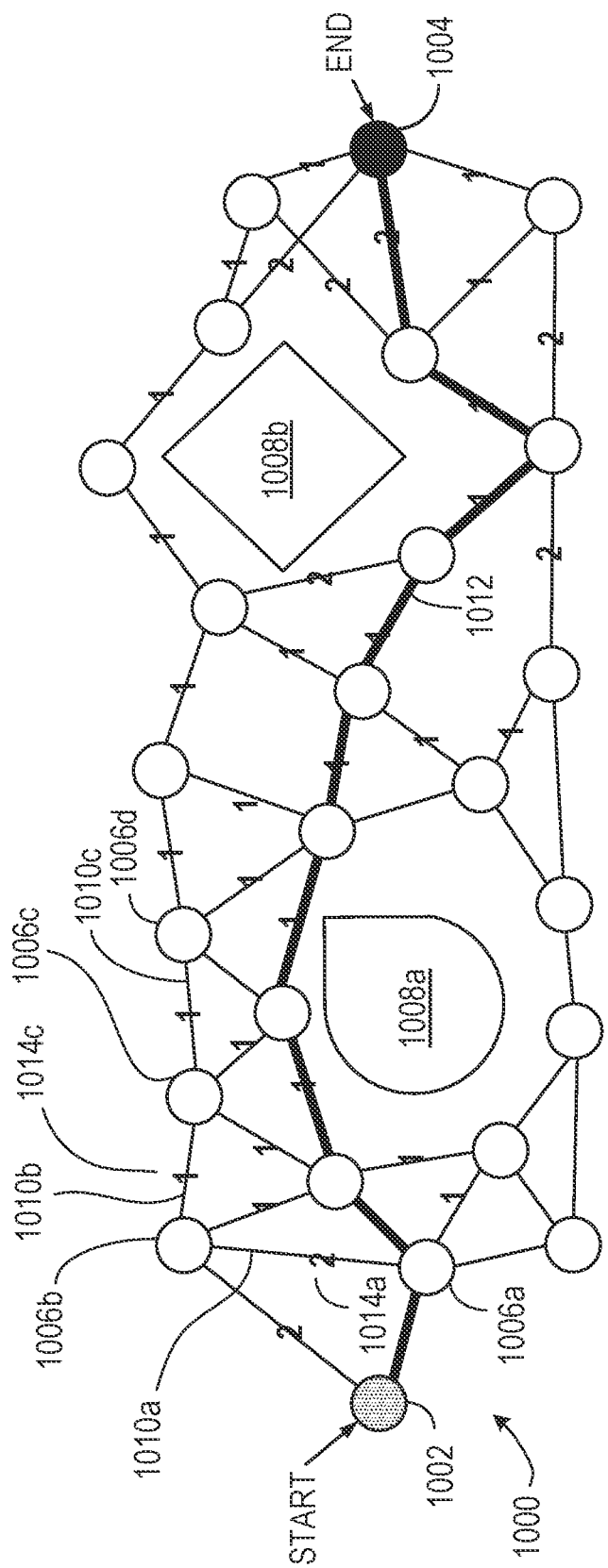
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
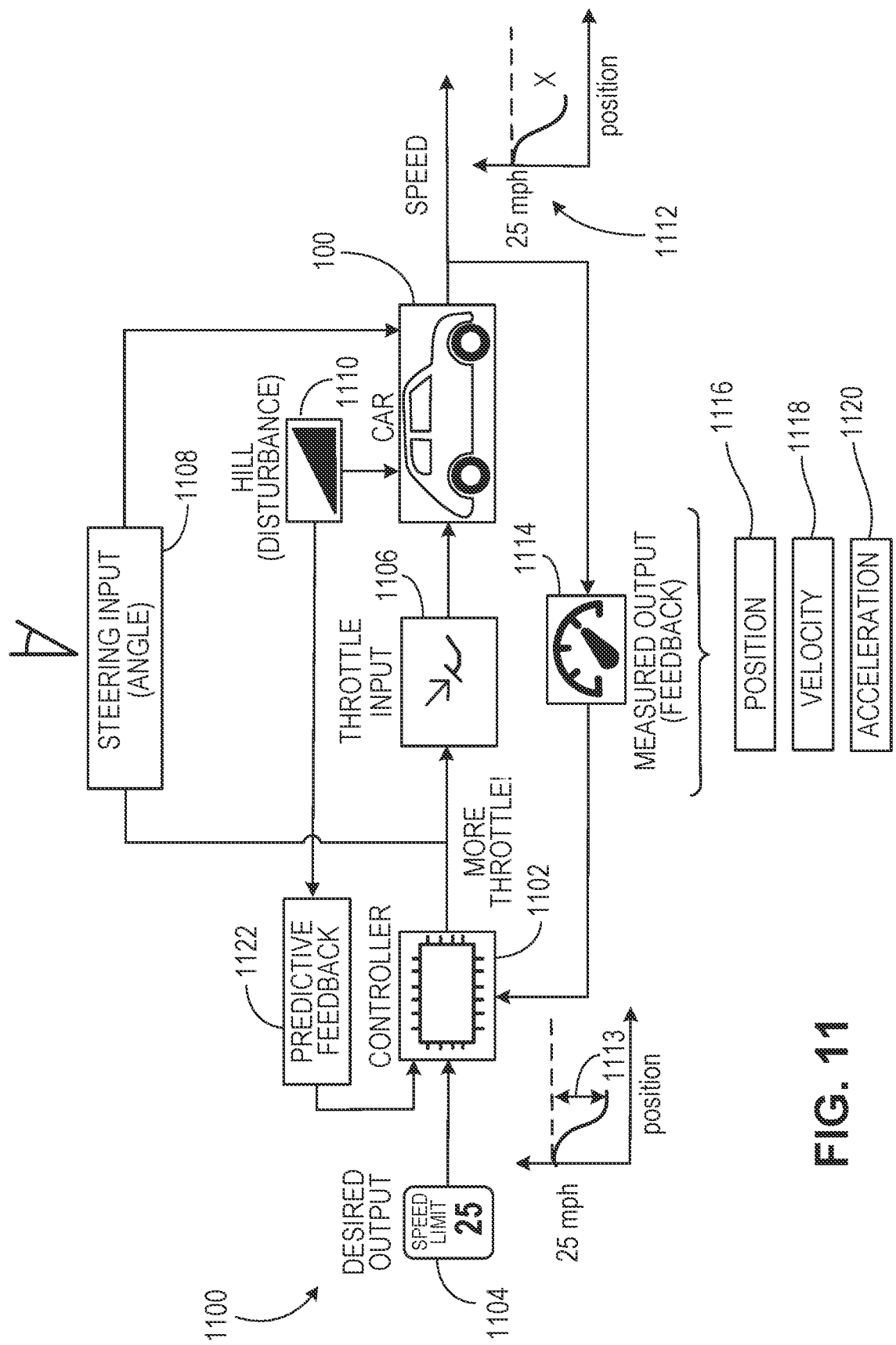
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
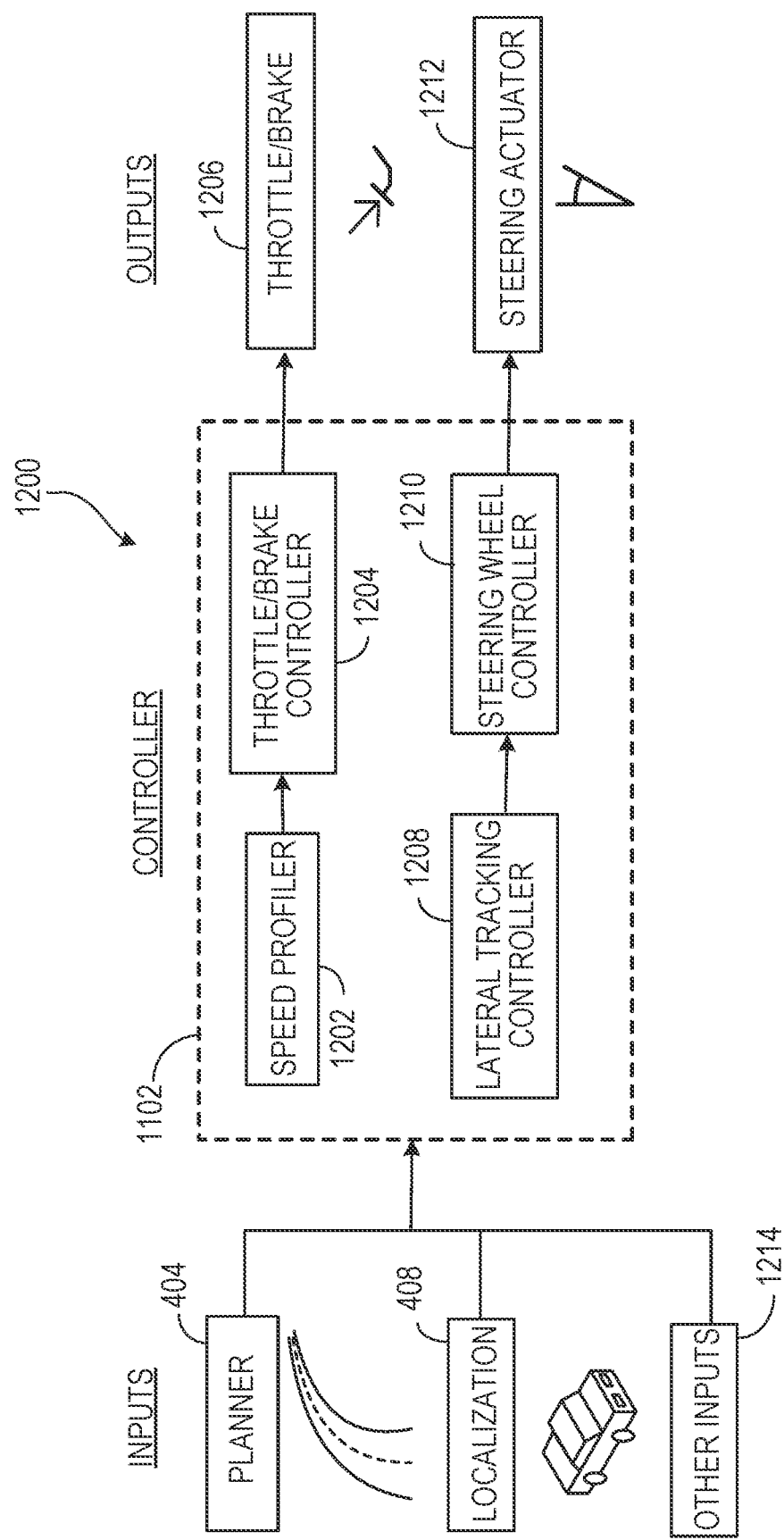
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Selecting a Trajectory for an Autonomous Vehicle

Figure 13:
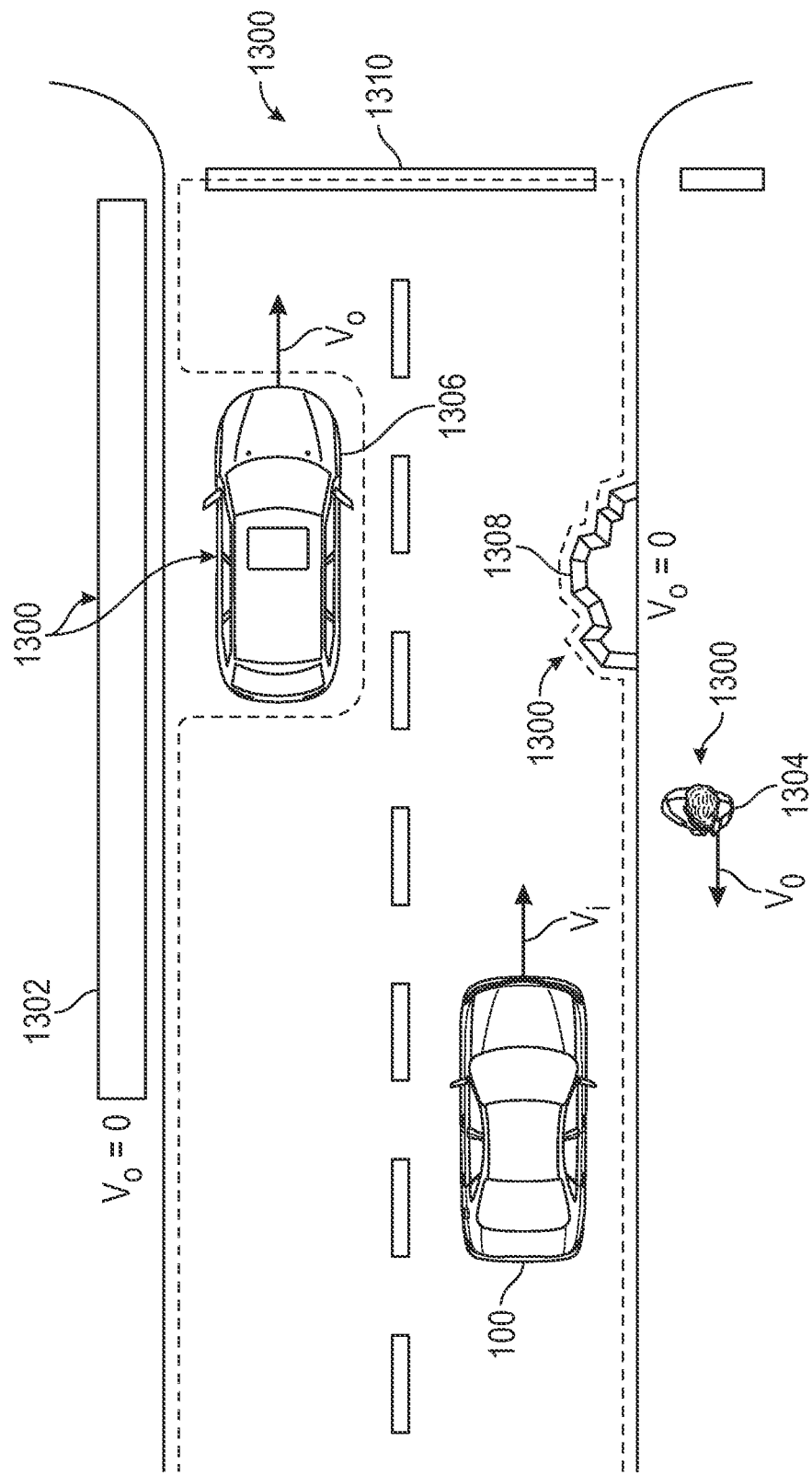
FIG. 13 illustrates an example of an autonomous vehicle navigating a roadway in the presence of various obstacles.

FIG. 13 illustrates an example of AV 100 navigating a roadway in the presence of various obstacles 1300 (e.g., 1302, 1304, 1306, 1308, and 1310). In some examples, obstacles 1300 can exist outside of the boundaries of the roadway, such as wall 1302 and pedestrian 1304, or can exist within the boundaries of the roadway, such as car 1306, pothole 1308, and stopline 1310. In some examples, obstacles 1300 can be fixed in location, such as wall 1302, pothole 1308, and stopline 1310, or can be moving (e.g., having a nonzero velocity), such as pedestrian 1304 and car 1306. Example systems and techniques for detecting and analyzing objects such as obstacles 1300 are described above with respect to at least FIGS. 1-8. FIG. 13 illustrates an example roadway environment that may be encountered when implementing process 1500 of FIG. 15 for selecting a trajectory for an autonomous vehicle by a system operating an autonomous vehicle.

FIGS. 14A-14D illustrate examples of AV 100 navigating a roadway along path 1401 in the presence of various obstacles, including parked car 1400 and stopline 1402 for an upcoming intersection. For example, path 1401 may represent a center line of a roadway or lane (e.g., the line along which a vehicle might ideally navigate if the roadway were free of obstacles). FIGS. 14A-14D illustrate example navigation scenarios that may be encountered when implementing example process 1500 of FIG. 15 for selecting a trajectory for an autonomous vehicle by a system operating an autonomous vehicle. Process 1500 is described in greater detail below with references to FIGS. 13 and 14A-14D.

Figure 14A:
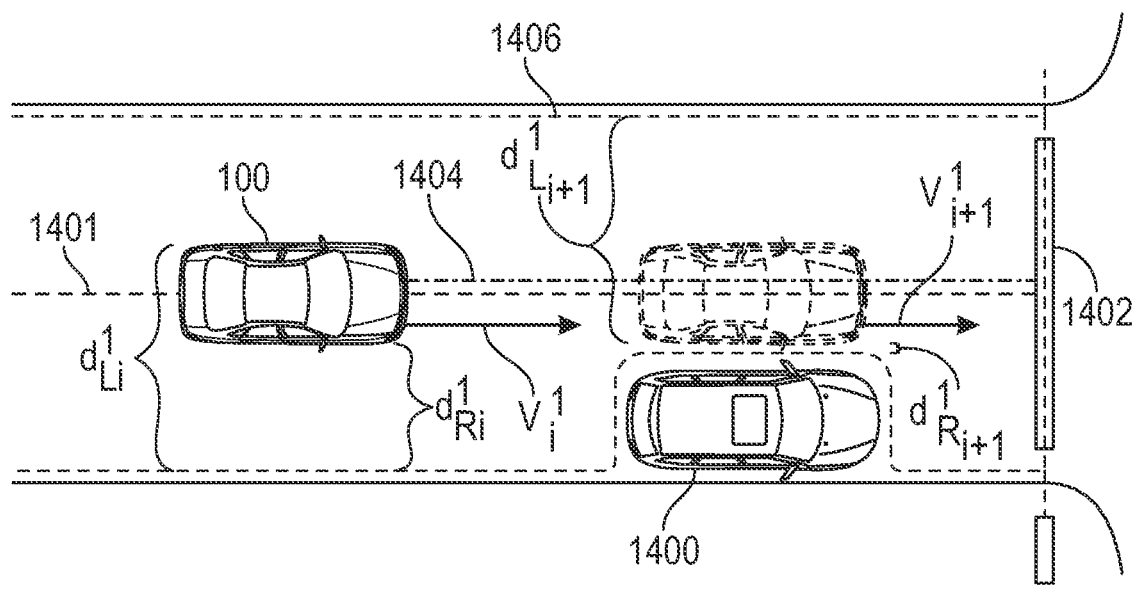
FIGS. 14A-14D illustrate examples of an autonomous vehicle navigating a roadway in the presence of various obstacles.

As shown in FIG. 14A, AV 100 navigates the roadway along path 1401 according to a first trajectory including first trajectory segment 1404. Example systems and techniques for generating trajectories, such as a trajectory including first trajectory segment 1404, are described above with respect to at least FIGS. 8 and 9. Although for illustrative purposes, first trajectory segment 1404 is depicted as being several yards in length, it will be understood that an overall trajectory (e.g., to navigate an autonomous vehicle from one geographic location to another) can be subdivided into trajectory segments of any appropriate size.

In some embodiments, navigating according to first trajectory segment 1404 satisfies certain objective safety criteria. In some embodiments, the objective safety criteria include lateral constraints 1406 (also referred to as "tube" constraints) placed on AV 100. That is, AV 100 must remain within a safe travel lane, which requires maintaining a minimum lateral separation between AV 100 and obstacles such as lane markers, the edges of the roadway, or parked car 1400. Lateral constraints 1406 may depend in part on the velocity of AV 100, such that AV 100 is required to maintain a larger minimum lateral separation between AV 100 and any obstacles the faster AV 100 is traveling. For example, if AV 100 is navigating a highway (e.g., at high speeds), lateral constraints 1406 require AV 100 to provide wider berth to obstacles than if AV 100 were navigating a parking garage (e.g., at low speeds). Navigating according to first trajectory segment 1404 at initial time i, AV 100 is traveling at a velocity $v_i^1$, the right side of AV 100 is a distance $d_{R_i}^1$ from any obstacles, and the left side of AV 100 is a distance $d_{L_i}^1$ from any obstacles. Given velocity $v_i^1$, distances $d_{R_i}^1$ and $d_{L_i}^1$ exceed the minimum distance defined by lateral constraints 1406. Likewise, navigating according to first trajectory segment 1404 at a subsequent time i+1, AV 100 is traveling at a velocity $v_{i+1}^1$, the right side of AV 100 is a distance $d_{R_{i+1}}^1$ from any obstacles, and the left side of AV 100 is a distance $d_{L_{i+1}}^1$ from any obstacles. Given velocity $v_{i+1}^1$ (e.g., a relatively lower velocity than $v_i^1$), distances $d_{R_{i+1}}^1$ and $d_{L_{i+1}}^1$ (e.g., relatively smaller distances than $d_{R_i}^1$ and $d_{L_i}^1$) still exceed the minimum distance defined by lateral constraints 1406. Accordingly, navigating according to first trajectory segment 1404 satisfies objective safety criteria constraining the lateral motion of AV 100.

In some examples, the objective safety criteria include speed constraints associated with (e.g., placed on) AV 100. Just as lateral constraints 1406 may depend in part on the velocity of AV 100, speed constraints may depend in part on the lateral separation between AV 100 and any obstacles, such that AV 100 is required to travel at a lower velocity when in close proximity with obstacles. For example, if AV 100 is navigating a narrow alleyway with nearby parked cars and/or structures (e.g., with minimal lateral separation between AV 100 and obstacles), speed constraints require AV 100 to travel at a lower velocity than if AV 100 were navigating a wide, empty road. Referring to FIG. 14A, given respective lateral separation distances $d_{R_i}^1$, $d_{L_i}^1$, $d_{R_{i+1}}^1$, and $d_{L_{i+1}}^1$, navigating first trajectory segment 1404 at respective velocities $v_i^1$ and $v_{i+1}^1$ satisfies speed constraints.

Figure 14B:
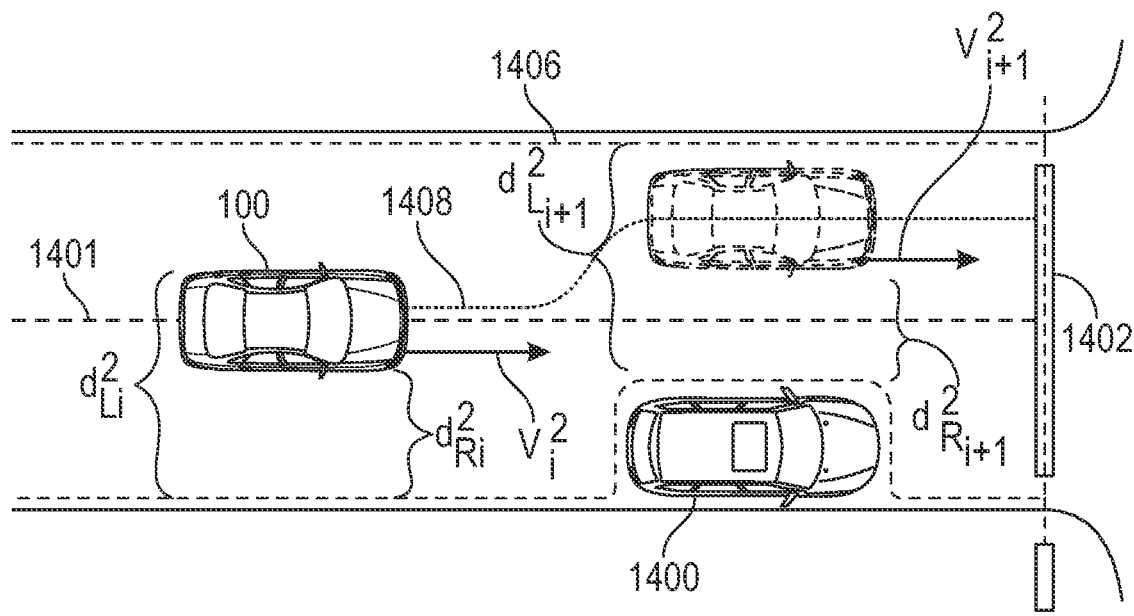

In FIG. 14B, AV 100 navigates the roadway along path 1401 according to a second trajectory including second trajectory segment 1408. Navigating according to second trajectory segment 1408 also satisfies certain objective safety criteria. For example, while navigating according to second trajectory segment 1408, distances $d_{R_i}^2$, $d_{L_i}^2$, $d_{R_{i+1}}^2$, and $d_{L_{i+1}}^2$ fall within the acceptable range required by lateral constraints 1406, and velocities $v_i^2$ and $v_{i+1}^2$ fall within the acceptable range required by speed constraints. Both first trajectory segment 1404 and second trajectory segment 1408 may thus be considered safe according to objective (e.g., predefined) standards.

However, even in a situation where both first trajectory segment 1404 and second trajectory segment 1408 are considered similarly (or equally) safe according to objective standards, the two trajectory segments may not be perceived by AV 100 as equally safe (e.g., based on objective criteria, such as the point of closest approach to an object, speed, and/or acceleration). Some trajectory segments that are determined to be unsafe by AV 100 may result in driver or passenger discomfort, or may deviate from trajectory segments that a typical human vehicle operator might follow (e.g., a distance from an object, speed, and/or acceleration that AV 100 determines to be unsafe correspond to a trajectory that a typical human would find uncomfortable). For example, although first trajectory segment 1404 satisfies lateral constraints 1406, when AV 100 passes parked car 1400 at subsequent time i+1, $d_{R_{i+1}}^1$ and $d_{L_{i+1}}^1$ for first trajectory segment 1404 are much smaller than $d_{R_{i+1}}^2$ and $d_{L_{i+1}}^2$ for second trajectory segment 1408. A human vehicle operator may thus typically navigate according to a trajectory more similar to second trajectory segment 1408 than first trajectory segment 1404. If AV 100 is a driver-assisted vehicle, navigating according to a trajectory segment that the human driver would not typically have chosen may result in the driver assuming manual control of the vehicle. If AV 100 is a fully autonomous vehicle, navigating according to first trajectory segment 1404 may result in a passenger becoming uncomfortable.

Figure 14C:
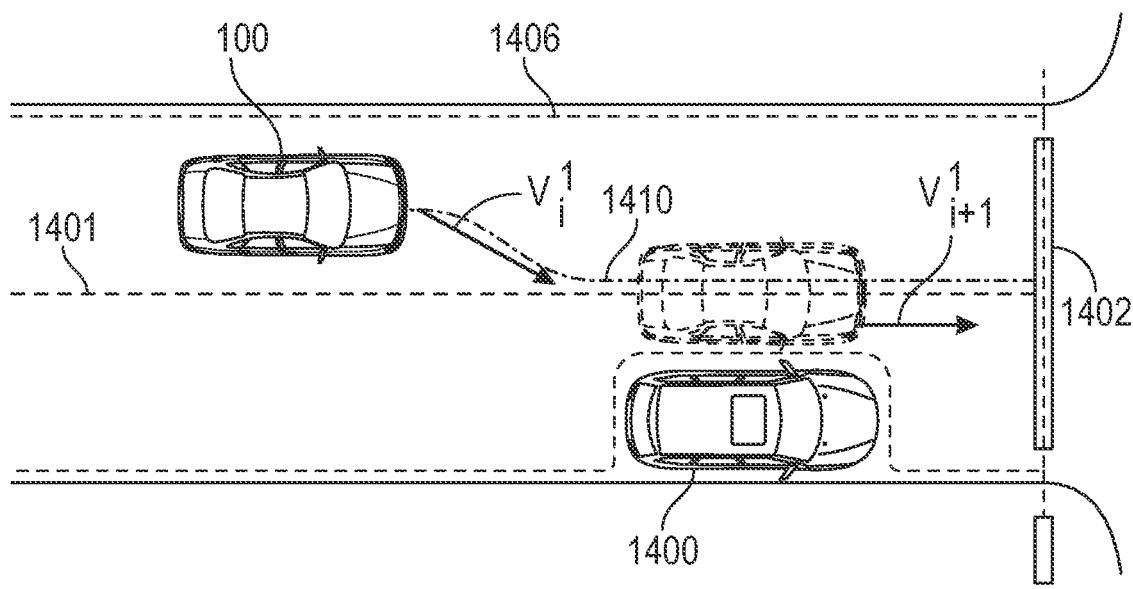
Figure 14D:
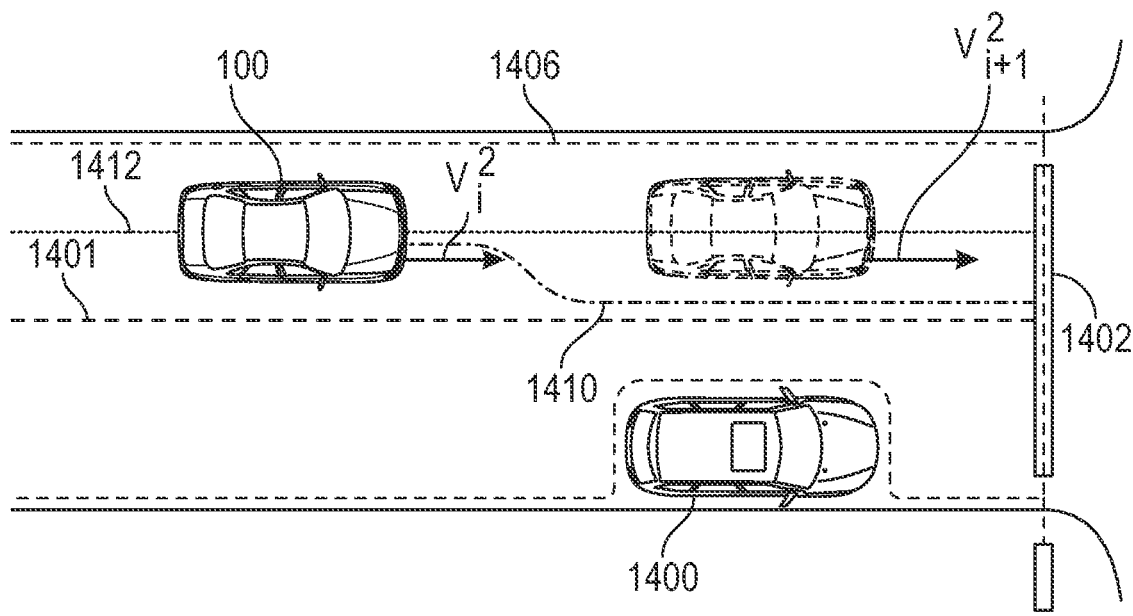

As another example, FIGS. 14C-14D illustrate AV 100 navigating a roadway having laterally deviated from path 1401. In FIG. 14C, AV 100 navigates according to a first trajectory including first trajectory segment 1410, which satisfies certain objective safety criteria. First trajectory segment 1410 also causes AV 100 to navigate towards the bottom edge of the roadway (e.g., as indicated by the direction of velocity $v_i^1$) until AV 100 has reduced its lateral deviation from path 1401 (e.g., until AV 100 is once again centered on the roadway).

In FIG. 14D, AV 100 instead navigates according to a second trajectory including a second trajectory segment 1412, which also satisfies certain objective safety criteria, but instead navigates forward in a straight line (e.g., as indicated by the direction of velocity $v_i^2$), maintaining the lateral deviation from path 1401. Although first trajectory segment 1410 and second trajectory segment 1412 may be considered similarly (or equally) safe according to objective standards, due to the presence of parked car 1400, a driver or passenger of AV 100 may be uncomfortable with the route taken in FIG. 14C (e.g., re-centering AV 100 on the roadway), as AV 100 steers toward an obstacle, rather than maintaining distance from the obstacle, as a human vehicle operator may typically choose to do. Accordingly, a driver or passenger of AV 100 may prefer second trajectory segment 1412.

In order to understand and act on perceived risk, the systems and techniques described herein can be used to select a trajectory optimized in light of perceived risk. The selection can be made by minimizing an overall cost function that includes perceived risk costs for a potential trajectory. By selecting a trajectory for an autonomous vehicle according to these systems and techniques, the autonomous vehicle is able to navigate according to a trajectory that not only satisfies objective safety criteria, but is also more likely to feel safe to a driver or passenger. This, in turn, discourages unexpected actions (e.g., assumption of control, deviation from driving norms by other drivers, and/or the like) by drivers and/or passengers and thus increases the efficiency and accuracy of navigation.

Example Process for Selecting a Trajectory for an Autonomous Vehicle

Figure 15:
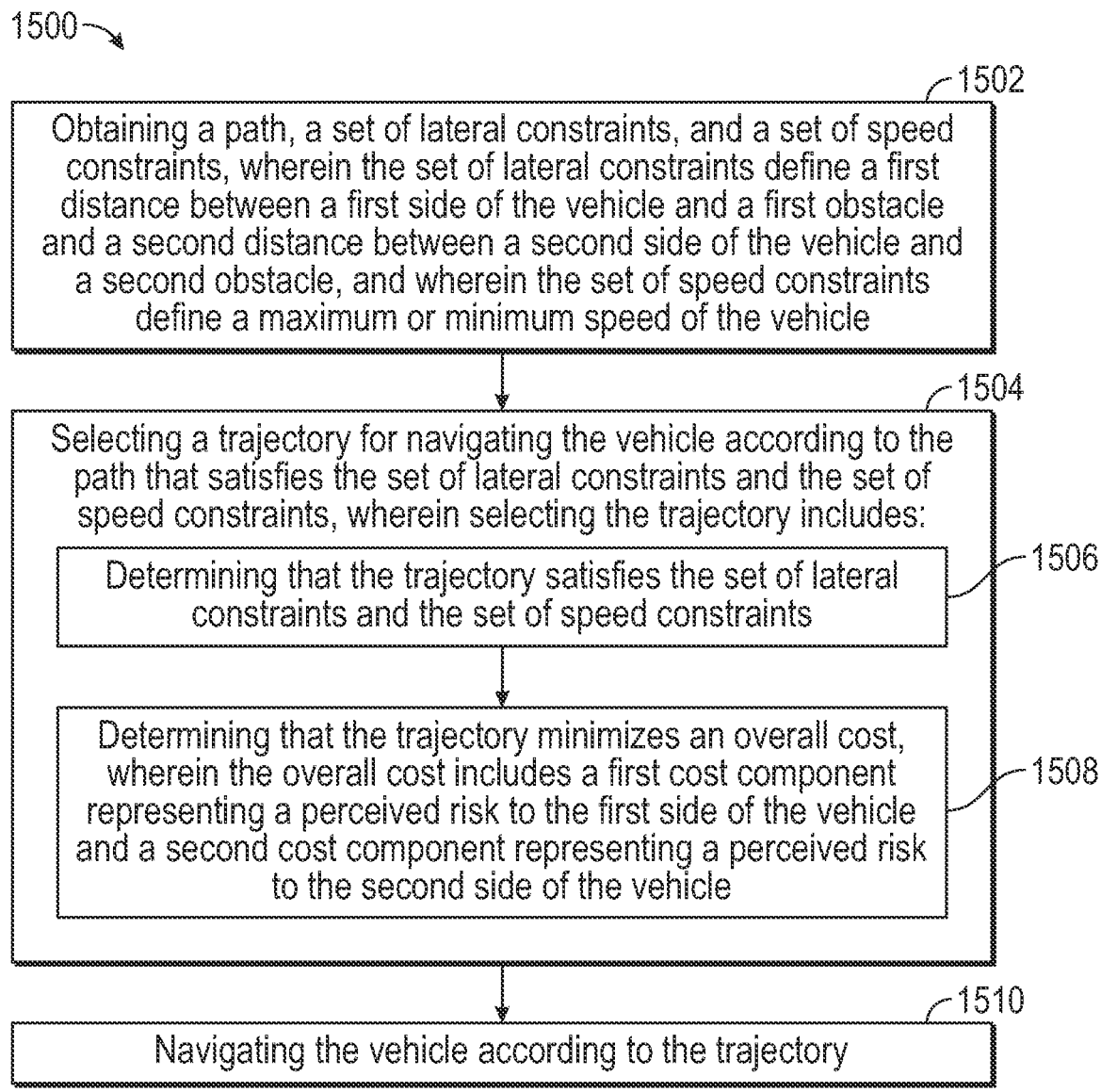
FIG. 15 is a flow chart of an example process for selecting a trajectory for an autonomous vehicle by a system operating an autonomous vehicle.

FIG. 15 is a flow chart of an example process 1500 for selecting a trajectory for an autonomous vehicle by a system operating an autonomous vehicle. In some embodiments, portions of process 1500 are performed by a control circuit (e.g., control module 406 of FIG. 4), which may include microcontrollers with embedded processing circuits. In some embodiments, portions of process 1500 are performed by a planner circuit (e.g., planning module 404 of FIG. 4). In some embodiments, portions of process 1500 can be performed by a system of one or more computers located in one or more locations, such as the AV system 120 (or portions thereof) and/or server 136 of FIG. 1.

While operating a vehicle (e.g., AV 100) in autonomous mode, at block 1502, the system obtains a path, a set of lateral constraints defining a distance between a first (e.g., right) side of the vehicle and a first obstacle and a second (e.g., left) side of the vehicle (e.g., opposite the first side) and a second obstacle, and a set of speed constraints defining a maximum and/or minimum speed of the vehicle. In some embodiments, the path may represent a baseline for navigation, such as a center line of a roadway or lane. In some embodiments, the first obstacle and the second obstacle can be the same obstacle. For example, referring momentarily to FIG. 14A, parked car 1400 is located close enough to AV 100 that both $d_{Ri+1}$ and $d_{Li+1}$ would be calculated relative to parked car 1400. In some embodiments, the path, the set of lateral constraints, and the set of speed constraints are received from a planner circuit (e.g., planning module 404 of FIG. 4).

At block 1504, a trajectory for navigating the vehicle (e.g., AV 100) along the path that satisfies the set of lateral constraints and the set of speed constraints (e.g., a trajectory that is safe according to certain objective criteria, and is thus a valid trajectory) is selected.

At block 1506, selecting the trajectory includes determining that the trajectory satisfies the set of lateral constraints and the set of speed constraints (e.g., that the trajectory is safe according to certain objective criteria, and is thus a valid potential trajectory).

At block 1508, selecting the trajectory includes determining that the trajectory minimizes an overall cost. The overall cost includes a first cost component representing a perceived risk to the first (e.g., right) side of the vehicle and a second cost component representing a perceived risk to the second (e.g., left) side of the vehicle. For example, if the trajectory includes first trajectory segment 1404, as depicted in FIG. 14A, the overall cost of the trajectory reflects the perceived risks to the left and right side of AV 100 caused by navigating AV 100 along the middle of the roadway, but closer to parked car 1400. If the trajectory includes second trajectory segment 1408, as depicted in FIG. 14B, the overall cost of the trajectory reflects the perceived risks to the left and right side of AV 100 caused by steering AV 100 farther away from parked car 1400, but closer to the edge of the roadway. As another example, if the trajectory includes first trajectory segment 1410, as depicted in FIG. 14C, the overall cost of first trajectory segment 1410 reflects the perceived risks to the left and right side of AV 100 caused by steering AV 100 in the direction of parked car 1400 in order to return to the middle of the roadway. If the trajectory includes second trajectory segment 1412, as depicted in FIG. 14D, the overall cost of the trajectory reflects the perceived risks to the left and right side of AV 100 caused by of navigating AV 100 straight along the edge of the roadway.

In some embodiments, the first cost component representing a perceived risk to the first (e.g., right) side of the vehicle and the second cost component representing a perceived risk to the second (e.g., left) side of the vehicle may each include a weight factor. For example, the objective measure of perceived risk can be incorporated in a parametric way in trajectory optimization techniques, using gradient-based approaches to make a weighted trade-off between different objectives (e.g., between costs associated with perceived risk and other costs, as described below) and converge to an optimal solution where the perceived risk is reflected accordingly.

For example, first cost component $\mathcal{C}_{right}$ and second cost component $\mathcal{C}_{left}$ may be defined as:

$$\mathcal{C}_{right} = \mathcal{W} \cdot \lambda_{right} \cdot \max(-\dot{d}_{lat}, 0)^2$$

$$\mathcal{C}_{left} = \mathcal{W} \cdot \lambda_{left} \cdot \max(-\dot{d}_{lat}, 0)^2$$

$$\lambda_{right} \text{ and } \lambda_{left} \in [0,1]$$

Where $\mathcal{W}$ represents the weight factor, $\lambda_{right}$ and $\lambda_{left}$ respectively represent a perceived risk to the right and left sides of the vehicle when navigating according to the potential trajectory, and $\dot{d}_{lat}$ represents the time derivative of clearance between the vehicle and an obstacle when navigating according to the potential trajectory (e.g., calculated using the velocity of the vehicle and the lateral separation between the vehicle and the obstacle). For example, where $\lambda_{right}$ (or $\lambda_{left}$) is equal to 0 (e.g., where the parameter is at the lowest extremity of its predefined range), there is no perceived risk to the right (or left) side of the vehicle, while where $\lambda_{right}$ (or $\lambda_{left}$) is equal to 1 (e.g., where the parameter is at the highest extremity of its predefined range), there is maximum perceived risk to the right (or left) side of the vehicle. For example, $\lambda_{right}$ and $\lambda_{left}$ may be represented as metadata associated with lateral constraints (e.g., lateral constraints 1406), such that $\lambda_{right}$ and $\lambda_{left}$ vary with time and the vehicle's location along the spatial "tube" of the lateral constraints.

In some embodiments, each respective first cost component (e.g., $\mathcal{C}_{right}$) and respective second cost component (e.g., $\mathcal{C}_{left}$) is based on a velocity of a perceived obstacle. For example, referring momentarily to FIG. 13, the velocity of walking pedestrian 1304 is towards AV 100 and the velocity of moving car 1306 is away from AV 100. By including the velocities of these obstacles in the calculation of the first cost component and second cost component, the first cost component and second cost component better reflect the perceived risk of, for instance, steering closer to a retreating obstacle (moving car 1306) versus closer to an approaching obstacle (walking pedestrian 1304). For example, in addition to the velocity of the vehicle and the lateral separation between the vehicle and the perceived obstacle, the respective values of $\dot{d}_{lat}$ may be calculated using a velocity of the perceived obstacle.

In some embodiments, the first cost component and the second cost component is determined using a control circuit (e.g., control module 406 of FIG. 4). In some embodiments, the first cost component and the second cost component is determined using a planner circuit (e.g., planning module 404 of FIG. 4). In some embodiments, the first cost component and the second cost component is determined using machine learning, for example, by using a machine learning model such as supervised learning, inverse reinforcement learning, or the like. For example, supervised learning may be used to learn a mapping function between features of a roadway environment and $\lambda_{right}$ and $\lambda_{left}$ based on a constructed dataset, such as a dataset of example driving data annotated with perceived risk levels, or a dataset of biometric data indicative of passenger comfort (such as heart rate) collected during example drives. As another example, inverse reinforcement learning may be used to extract $\lambda_{right}$ and $\lambda_{left}$ by correlating a large dataset of expert driving data with the features of the roadway environment.

In some embodiments, the overall cost of the trajectory may further include a deviation cost component based on a lateral deviation from the path. That is, in examples where the path represents a center line of a roadway, the deviation cost would introduce a preference for driving along the center (as opposed to the edge) of the roadway. The deviation cost may also be weighted, such that depending on how the deviation cost is weighted, the introduced preference may be strong or slight.

In some embodiments, the overall cost associated with the trajectory may further include one or more other cost factors affecting the desirability of navigating according to the trajectory, such as objective cost factors for user comfort (e.g., accounting for steering motion and acceleration), compliance (e.g., accounting for potential fines if a trajectory violates a traffic rule), time efficiency (e.g., speed), fuel efficiency, and so forth. These one or more other cost factors included in the plurality of overall costs may also be weighted, such that the weight of each other cost factor indicates the importance with respect to other cost factors (including the first and second cost components representing perceived risk).

In some embodiments, the overall cost is determined using a control circuit (e.g., control module 406 of FIG. 4). In some embodiments, the overall cost is determined using a planner circuit (e.g., planning module 404 of FIG. 4).

As the overall cost may include various cost components, including but not limited to the cost components described above, determining that the trajectory minimizes the overall cost at block 1508 does not necessarily determine that the trajectory minimizes the first and second cost components representing perceived risk. For example, the selected (e.g., optimized) trajectory may have a minimized first cost component representing the perceived risk to the first side of the vehicle and a minimized second cost component representing the perceived risk to the second side of the vehicle, as the low costs associated with perceived risk may result in a low (e.g., minimized) overall cost. However, in other examples, the selected (e.g., optimized) trajectory may not have a minimized first cost component representing the perceived risk to the first side of the vehicle or a minimized second cost component representing the perceived risk to the second side of the vehicle, as long as the costs associated with perceived risk are still low enough that the overall cost including those cost components is still minimized.

At block 1510, the vehicle is navigated according to the trajectory (e.g., the trajectory with the minimized overall cost). Accordingly, all other cost factors being equal, the vehicle navigates the path according to the trajectory with the lowest costs associated with perceived risk—that is, the trajectory that results in improved driver or passenger comfort, or seems more similar to a trajectory that a typical human vehicle operator might follow.

It will be understood that in some embodiments, example process 1500, and in particular blocks 1504-1510, may be iterated many times while navigating a vehicle in an autonomous mode. For example, blocks 1504-1510 may be performed with respect to the trajectory segments comprising potential trajectories. A trajectory composed of each of the selected trajectory steps thus represents an optimized trajectory in light of the overall costs of each step, including first cost components representing the perceived risks to the first side of the vehicle and second cost components representing the perceived risks to the second side of the vehicle as the vehicle moves incrementally along.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the claims, and what is intended by the applicants to be the scope of the claims, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system, comprising:
   one or more computer processors; and
   one or more non-transitory storage media storing instructions which, when executed by the one or more computer processors, cause performance of operations comprising:
   while a vehicle is operating in an autonomous mode:
      obtaining a path, a set of lateral constraints, and a set of speed constraints, wherein the set of lateral constraints define a first distance between a first side of the vehicle and a first obstacle and a second distance between a second side of the vehicle and a second obstacle, and wherein the set of speed constraints define a maximum or minimum speed of the vehicle;
      selecting a first trajectory segment or a second trajectory segment of a trajectory for navigating the vehicle according to the path that satisfies the set of lateral constraints and the set of speed constraints, wherein the selecting includes:
      determining that both of the first trajectory segment and the second trajectory segment of the trajectory meet one or more objective safety criteria comprising the set of lateral constraints and the set of speed constraints, wherein the first trajectory segment and the second trajectory segment have different perceived risks with respect to the first and second sides of the vehicle, and wherein the perceived risks are those predicted by the system to be perceived as risks by a human within the vehicle, and in response to both of the first trajectory segment and the second trajectory segment of the trajectory meeting the one or more objective safety criteria, selecting one of the first trajectory segment or the second trajectory segment of the trajectory that minimizes an overall cost including a first cost component representing a first perceived risk to the first side of the vehicle and a second cost component representing a second perceived risk to the second side of the vehicle, wherein the minimized overall cost has a lower perceived risk with respect to the first and second sides of the vehicle and satisfies the one or more objective safety criteria; and controlling the vehicle to move according to the selected one of the first trajectory segment or the second trajectory segment of the trajectory, wherein the set of lateral constraints define a first minimum distance between the first side of the vehicle and the first obstacle, and a second minimum distance between the second side of the vehicle and the second obstacle, wherein, in both of the first trajectory segment and the second trajectory segment of the trajectory, the vehicle is configured to maintain a lateral distance exceeding the first minimum distance from the first side of the vehicle and maintain a lateral distance exceeding the second minimum distance from the second side of the vehicle, wherein the lateral distances to be maintained by the vehicle and the first and second minimum distances are different in the first trajectory segment and the second trajectory segment, and wherein the selected one of the first trajectory segment or the second trajectory segment has a lateral distance greater than that of the other of the first trajectory segment or the second trajectory segment.

2. The system of claim 1, wherein the first cost component includes a first weight factor and wherein the second cost component includes a second weight factor.

3. The system of claim 1, wherein the first cost component and the second cost component are based on a velocity of a perceived obstacle.

4. The system of claim 1, wherein the overall cost further includes a third cost component based on a lateral deviation from the path caused by the trajectory.

5. The system of any of claim 1, wherein the first cost component and the second cost component are determined using a control circuit configured to control one or more of steering, braking, throttling, or ignition of the vehicle.

6. The system of claim 1, wherein the first cost component and the second cost component are determined using a planner circuit configured to determine a vehicle trajectory based on destination data.

7. The system of claim 1, wherein the overall cost is determined using a control circuit configured to control one or more of steering, braking, throttling, or ignition of the vehicle.

8. The system of claim 1, wherein the overall cost is determined using a planner circuit configured to determine a vehicle trajectory based on destination data.

9. The system of claim 1, wherein the path, the set of lateral constraints, and the set of speed constraints are received from a planner circuit configured to determine a vehicle trajectory based on destination data.

10. The system of claim 1, wherein the first cost component and the second cost component are determined using machine learning techniques.

11. A method, comprising:

while a vehicle is operating in an autonomous mode:

obtaining a path, a set of lateral constraints, and a set of speed constraints, wherein the set of lateral constraints define a first distance between a first side of the vehicle and a first obstacle and a second distance between a second side of the vehicle and a second obstacle, and wherein the set of speed constraints define a maximum or minimum speed of the vehicle;

selecting a first trajectory segment or a second trajectory segment of a trajectory for navigating the vehicle according to the path that satisfies the set of lateral constraints and the set of speed constraints, wherein the selecting includes:

determining that both of the first trajectory segment and the second trajectory segment of the trajectory meet one or more objective safety criteria comprising the set of lateral constraints and the set of speed constraints, wherein the first trajectory segment and the second trajectory segment have different perceived risks with respect to the first and second sides of the vehicle, and wherein the perceived risks are those predicted to be perceived as risks by a human within the vehicle, and in response to both of the first trajectory segment and the second trajectory segment of the trajectory meeting the one or more objective safety criteria, selecting one of the first trajectory segment or the second trajectory segment of the trajectory that minimizes an overall cost including a first cost component representing a first perceived risk to the first side of the vehicle and a second cost component representing a second perceived risk to the second side of the vehicle, wherein the minimized overall cost has a lower perceived risk with respect to the first and second sides of the vehicle and satisfies the one or more objective safety criteria; and controlling the vehicle to move according to the selected one of the first trajectory segment or the second trajectory segment of the trajectory, wherein the set of lateral constraints define a first minimum distance between the first side of the vehicle and the first obstacle, and a second minimum distance between the second side of the vehicle and the second obstacle, wherein, in both of the first trajectory segment and the second trajectory segment of the trajectory, the vehicle is configured to maintain a lateral distance exceeding the first minimum distance from the first side of the vehicle and maintain a lateral distance exceeding the second minimum distance from the second side of the vehicle, wherein the lateral distances to be maintained by the vehicle and the first and second minimum distances are different in the first trajectory segment and the second trajectory segment, and wherein the selected one of the first trajectory segment or the second trajectory segment has a lateral distance greater than that of the other of the first trajectory segment or the second trajectory segment.

12. The method of claim 11, wherein the first cost component includes a first weight factor and the second cost component includes a second weight factor.

13. The method of claim 11, wherein the first cost component and the second cost component is based on a velocity of a perceived obstacle.

14. The method of claim 11, wherein the overall cost further includes a third cost component based on a lateral deviation from the path caused by the trajectory.

15. The method of claim 11, wherein the first cost component and the second cost component are determined using a control circuit configured to control one or more of steering, braking, throttling, or ignition of the vehicle.

16. The method of claim 11, wherein determining the first cost component and the second cost component are determined using a planner circuit configured to determine a vehicle trajectory based on destination data.

17. The method of claim 11, wherein the overall cost is determined using a control circuit configured to control one or more of steering, braking, throttling, or ignition of the vehicle.

18. The method of claim 11, wherein the overall costs is determined using a planner circuit configured to determine a vehicle trajectory based on destination data.

19. The method of claim 11, wherein the path, the set of lateral constraints, and the set of speed constraints are received from a planner circuit configured to determine a vehicle trajectory based on destination data.

20. A non-transitory computer-readable storage medium storing instructions which, when executed by one or more computing devices, cause performance of operations comprising:
while a vehicle is operating in an autonomous mode:
obtaining a path, a set of lateral constraints, and a set of speed constraints, wherein the set of lateral constraints define a first distance between a first side of the vehicle and a first obstacle and a second distance between a second side of the vehicle and a second obstacle, and wherein the set of speed constraints define a maximum or minimum speed of the vehicle;
selecting a first trajectory segment or a second trajectory segment of a trajectory for navigating the vehicle according to the path that satisfies the set of lateral constraints and the set of speed constraints, wherein the selecting includes:
determining that both of the first trajectory segment and the second trajectory segment of the trajectory meet one or more objective safety criteria comprising the set of lateral constraints and the set of speed constraints, wherein the first trajectory segment and the second trajectory segment have different perceived risks with respect to the first and second sides of the vehicle, and wherein the perceived risks are those predicted to be perceived as risks by a human within the vehicle, and
in response to both of the first trajectory segment and the second trajectory segment of the trajectory meeting the one or more objective safety criteria, selecting one of the first trajectory segment or the second trajectory segment of the trajectory that minimizes an overall cost including a first cost component representing a first perceived risk to the first side of the vehicle and a second cost component representing a second perceived risk to the second side of the vehicle, wherein the minimized overall cost has a lower perceived risk with respect to the first and second sides of the vehicle and satisfies the one or more objective safety criteria; and
controlling the vehicle to move according to the selected one of the first trajectory segment or the second trajectory segment of the trajectory,
wherein the set of lateral constraints define a first minimum distance between the first side of the vehicle and the first obstacle, and a second minimum distance between the second side of the vehicle and the second obstacle, wherein, in both of the first trajectory segment and the second trajectory segment of the trajectory, the vehicle is configured to maintain a lateral distance exceeding the first minimum distance from the first side of the vehicle and maintain a lateral distance exceeding the second minimum distance from the second side of the vehicle, wherein the lateral distances to be maintained by the vehicle and the first and second minimum distances are different in the first trajectory segment and the second trajectory segment, and wherein the selected one of the first trajectory segment or the second trajectory segment has a lateral distance greater than that of the other of the first trajectory segment or the second trajectory segment.

21. The system of claim 1, wherein the one or more non-transitory storage media storing instructions which, when executed by the one or more computer processors, further cause performance of operations comprising:
calculating the first cost component ($C_{right}$) and the second cost component ($C_{right}$) usign the following equation:

$$C_{right} = \omega \lambda_{right} \cdot \max(-\dot{d}_{lat}, 0)^2$$

$$C_{left} = \omega \lambda_{left} \cdot \max(\dot{d}_{lat}, 0)^2$$

$$\lambda_{right} \text{ and } \lambda_{left} \in [0,1],$$

where represents a weight factor, $\lambda_{right}$ and $\lambda_{left}$ respectively represent a perceived risk to right and left sides of the vehicle, and $\dot{d}_{lat}$ represents a time derivative of clearance between the vehicle and the first or second obstacle.

22. The system of claim 1, wherein one of the first trajectory segment or the second trajectory segment is selected to reduce discomfort of a driver or a passenger of an autonomous vehicle.

23. The system of claim 1, further comprising:
calculating the first perceived risk based on the first distance and at least one of a speed of the vehicle, a type of the first obstacle, or a speed of the first obstacle; and
calculating the second perceived risk based on the second distance and at least one of the speed of the vehicle, a type of the second obstacle, or a speed of the second obstacle.

24. The system of claim 1, wherein the first cost component is calculated based at least in part on a time derivative of the first distance between the first side of the vehicle and the first obstacle when the vehicle navigates according to the first trajectory segment or the second trajectory segment, and
wherein the second cost component is calculated based at least in part on a time derivative of the second distance between the second side of the vehicle and the second obstacle when the vehicle navigates according to the first trajectory segment or the second trajectory segment.

* * * * *